（12） United States Patent
Lin et al.

(10) Patent No.: US 7,486,101 B2
(45) Date of Patent: Feb. 3, 2009

(54) METHOD AND APPARATUS FOR INSPECTING FLEXIBLE DISPLAY MEDIUM LAYER

(75) Inventors: Yan-Rung Lin, Wandan Township, Pingtung County (TW); Shie-Chang Jeng, Ligang Township, Pingtung County (TW); Chi-Chang Liao, Tainan (TW); Jow-Tsong Shy, Hsinchu (TW)

(73) Assignees: Industrial Technology Research Institute, Hsinchu (TW); National Tsing Hua University, Hsinchu (TW)

( * ) Notice: Subject to any disclaimer, the term of this patent is extended or adjusted under 35 U.S.C. 154(b) by 196 days.

(21) Appl. No.: 11/245,349

(22) Filed: Oct. 5, 2005

(65) Prior Publication Data

US 2007/0030023 A1 Feb. 8, 2007

(30) Foreign Application Priority Data

Aug. 8, 2005 (TW) .............................. 94126675 A

(51) Int. Cl.
*G01R 31/00* (2006.01)
(52) U.S. Cl. .................................................... 324/770
(58) Field of Classification Search .............. 324/158.1, 324/758–770; 427/10, 127–132; 73/865.8
See application file for complete search history.

(56) References Cited

U.S. PATENT DOCUMENTS 5,451,427 A * 9/1995 Takahashi et al. ........... 427/130
6,329,816 B1 * 12/2001 Suzuki et al. ............... 324/229
6,645,614 B1 * 11/2003 Girt et al. ................... 428/336
7,181,979 B1 * 2/2007 Lin et al. ...................... 73/852
7,182,976 B2 * 2/2007 Takahashi et al. ........... 427/164
7,236,292 B2 * 6/2007 LeCain et al. ............... 359/296
7,365,562 B2 * 4/2008 Jeon ........................... 324/770
2007/0296452 A1 * 12/2007 Kang et al. .................. 324/770

FOREIGN PATENT DOCUMENTS

JP 04-198914 7/1992
JP 07-013116 1/1995

* cited by examiner

*Primary Examiner*—Ha Tran T Nguyen
*Assistant Examiner*—Trung Q Nguyen
(74) *Attorney, Agent, or Firm*—J.C. Patents

(57) ABSTRACT

A method provides for inspecting flexible display medium layer, on which a driving electrode structure to be formed is not complete or there is no driving electrode structure. The flexible display medium layer passes an inspection area. Then, the inspected method is applied to inspect a performance of the flexible display medium layer on a corresponding region being passing the inspection area. The inspected results are recorded, in which the information for indicating a functional performance of the flexible display medium layer is recorded or shown according to a performance level. An apparatus can inspect the flexible display medium layer in accordance with the foregoing method.

14 Claims, 7 Drawing Sheets

METHOD AND APPARATUS FOR INSPECTING FLEXIBLE DISPLAY MEDIUM LAYER

CROSS-REFERENCE TO RELATED APPLICATION

This application claims the priority benefit of Taiwan application Ser. No. 94126675, filed on Aug. 8, 2005. All disclosure of the Taiwan application is incorporated herein by reference.

BACKGROUND OF THE INVENTION

1. Field of the Invention

The present invention relates to a flexible display device. More particularly, the present invention relates to a technique for inspecting a flexible display medium layer.

2. Description of the Related Art

Due to the properties of thin, light, impact resistant and flexibility, flexible display products are rather portable. In the meantime, the products can be easily processed and cut into different shapes for diversified designs and provide considerable design freedom. It has a great potential to replace the conventional flat panel display as the next generation displays and to apply to a new marketplace. The special properties of a flexible display device also permit the transition from a sheet-fed batch processing to a roll-to-roll manufacturing. As a result, the production cost of the flexible display device will drop significantly. Moreover, the separate manufacturing of the driving electrode layer and the display medium layer is another newly developed concept in the roll-to-roll manufacturing. According to the requirements of the display, driving electrode layers are attached to the upper and the lower surface of the display medium layer.

FIGS. 1A and 1B are diagrams, schematically showing the structure of a flexible display device. The structure of a flexible display device 104 mainly comprises a flexible display medium layer 110. Then, one or two adhesive layers 108 and 112 are coated on the top and the bottom surface or on one of the surfaces of the flexible display medium layer 110. Furthermore, a driving electrode structure comprising a top electrode layer 114 and a bottom electrode layer 106 is attached to the top surface and the bottom surface or one of the surfaces of the flexible display medium layer 110 through the adhesive layer 108 and the adhesive layer 112 respectively. Since the actual structure of the foregoing flexible display device should be familiar to the ordinary skilled artisans in the art, a detailed description is omitted.

The performance inspection of the flexible display device at the end of fabrication using the conventional manufacturing technique is shown in FIG. 2. The flexible display device 132 is carried through a conveyor system such as a roller 130. Some of the processes includes: An orientation treatment unit 134 to carry out necessary orientation operations. The display device with electrodes 132 is delivered to the inspection area 136, the cutting area 137, the categorization area 138 and the collection area 139 in sequence, each providing a corresponding treatment.

In the aforementioned inspection, the electrode structures have already formed in the flexible display device. The cutaway portions, the malfunction parts, contain the finished electrode structures. Since some material is wasted in the production process, the inspection flow is necessary to be improved.

SUMMARY OF THE INVENTION

Accordingly, at least one objective of the present invention is to provide a method and an apparatus for inspecting a flexible display medium layer capable of performing a performance level inspection on the display medium layer before attaching electrode layers. Hence, the production cost can be reduced and the product yield can be increased.

To achieve these and other advantages and in accordance with the purpose of the invention, as embodied and broadly described herein, the invention provides a method for inspecting a flexible display medium layer. The method includes providing a flexible display medium layer that requires an inspection such that the driving electrode structure needed on the flexible display medium layer has not yet been completed or the flexible display medium layer has no driving electrode structure. The flexible display medium layer passes through an inspection area. Then, a performance level inspection is applied to inspect the performance level of the flexible display medium layer when it passes through a corresponding region in the inspection area. The inspection results including the performance level and information regarding the malfunctioning region in the flexible display medium layer are recorded or displayed.

According to one preferred embodiment of the present invention, the aforementioned inspecting method may include applying an electric field or a magnetic field to perform an performance level inspection.

The present invention also provides an inspection apparatus for inspecting a flexible display medium layer. The inspection apparatus comprises an inspection unit, a conveyor system and a recording or displaying unit. The conveyor system conveys the flexible display medium layer or the inspection system so that the inspection unit can inspect a corresponding region of the flexible display medium layer. The flexible display medium layer has either incomplete driving electrode structures or no driving electrode structures. The recording unit is coupled to the inspection unit. According to the result in the inspection unit, information regarding the malfunctioning region in the flexible display medium layer is labeled or the performance level is recorded. The inspection unit applies an electric field or a magnetic field to inspect the performance level of the flexible display medium layer.

In one preferred embodiment of the present invention, if the flexible display medium layer has no driving electrode structure, the inspection unit in the inspection apparatus may comprise: a pair of electrode plates or a pair of magnetic poles for applying an electric field or a magnetic field to a corresponding region of the flexible display medium layer; a light source for illuminating the corresponding region, and a detector for receiving an optical signal after the light has passed through or reflected from the flexible display medium layer and performing necessary processing and analysis to find the performance level and malfunctioning region information.

According to one preferred embodiment of the present invention, if the flexible display medium layer has no driving electrode structure, the inspection unit in the inspection apparatus may comprise an electrode plate, a roller that may or may not participate in the transportation of the flexible display medium layer, a roller electrode layer disposed on the surface of the roller and coupled with the electrode plate for applying an electric field to the corresponding region of the flexible display medium layer, a light source that illuminates the corresponding region, and a detector for receiving an optical signal after the light has passed through or reflected from the flexible display medium layer and performing necessary processing and analysis to find the performance level and malfunctioning region information.

According to one preferred embodiment of the present invention, if the flexible display medium layer has no driving electrode structure, the inspection unit and the conveyor system of the inspection apparatus can be combined together to form an integrated unit. The transporting surface, where the conveyor system is in contact with the flexible display medium layer, is also an electrode so that an electric field can be applied to the corresponding region of the flexible display medium layer.

According to one preferred embodiment of the present invention, if the driving electrode structure on a flexible display medium layer has only one electrode layer, the inspection unit of the inspection apparatus may comprise: an external electrode unit coupled to the electrode layer so that an electric field or a magnetic field can be applied to the corresponding region of the flexible display medium layer; a light source for illuminating the corresponding region; and, a detector for receiving an optical signal after the light has passed through or reflected from the flexible display medium layer and performing necessary processing and analysis to find the performance level and malfunctioning region information.

According to one preferred embodiment of the present invention, if the driving electrode structure on the flexible display medium layer has only one electrode layer, the inspection unit and the conveyor system of the inspection apparatus can be combined together to form an integrated unit. At least a portion of the surface, where the conveyor system is in contact with the flexible display medium layer, is an electrode that can couple with the electrode layer for applying an electric field to the corresponding region of the flexible display medium layer.

According to one preferred embodiment of the present invention, if the driving electrode structure on the flexible display medium layer has only one electrode layer, the aforementioned integrated unit of the inspection apparatus may comprise: a first roller that participate or not participate in the transportation of the flexible display medium layer; a roller electrode layer disposed on a surface of the first roller; at least a second roller that matches its motion with the first roller for transporting the flexible display medium layer, and in the meantime, applying an electric field to the corresponding region between the electrode layer on the flexible display medium layer and the roller electrode layer on the first roller; a light source for illuminating the corresponding region; and, a detector for receiving an optical signal after the light from the light source has passed through or reflected from the flexible display medium layer and performing necessary processing and analysis to find the performance level and malfunctioning region information.

According to the present invention, a performance level inspection of the flexible display medium layer can be carried out before the fabrication of the electrode layers is complete or prior to the fabrication of the electrode layers. Thus, some production cost can be saved and the product yield can be increased.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1A:
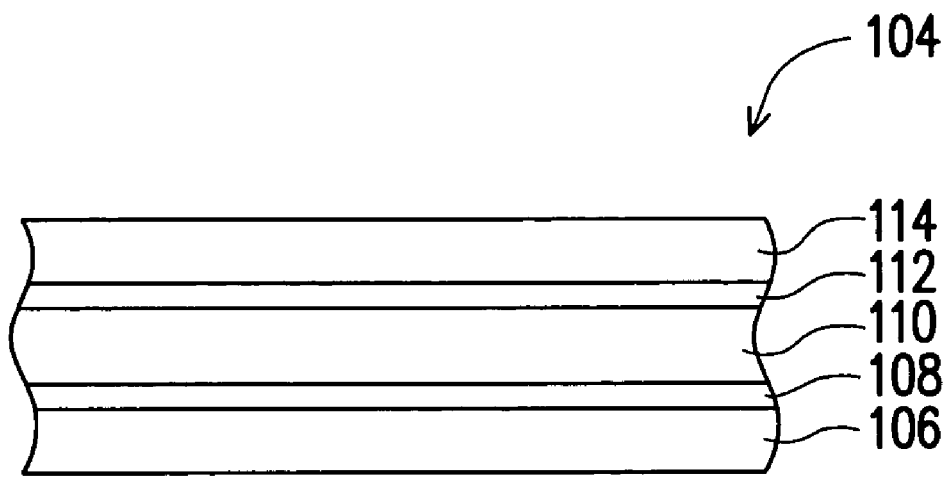
FIGS. 1A and 1B are diagrams showing the structure of a conventional flexible display device.
Figure 1B:
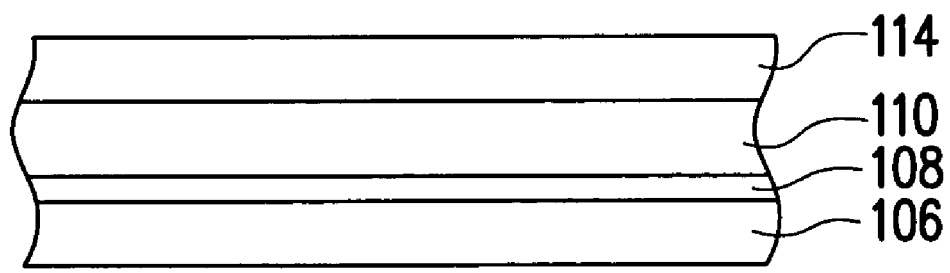
Figure 2:
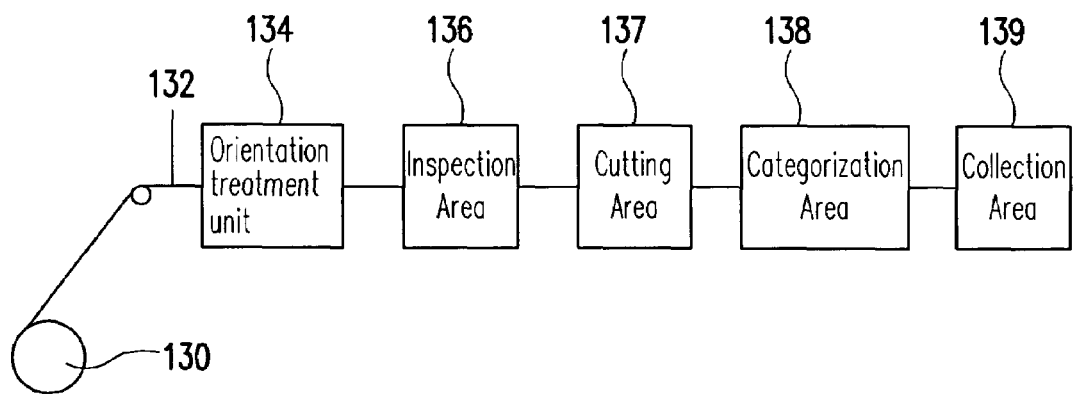
FIG. 2 is a flow diagram showing the inspection of a conventional flexible liquid crystal display device.

Reference will now be made in detail to the present preferred embodiments of the invention, examples of which are illustrated in the accompanying drawings. Wherever possible, the same reference numbers are used in the drawings and the description to refer to the same or like parts.

In the foregoing method of fabricating a flexible display device, the inspection method can be improved so that the production cost is reduced. In the following, a method and an apparatus for inspecting a flexible display medium layer is explained using embodiments. However, the present invention should by no means be limited by the descriptions in the embodiments.

The inspection apparatus in the present invention can be used for inspecting a flexible display medium layer. The inspection apparatus comprises an inspection unit, a conveyer system and a recording or displaying unit. The conveying system is used for transporting flexible display medium layers so that flexible display medium layers can pass the inspection unit and the inspection unit can inspect a corresponding region.

It should be noted that the formation of a driving electrode structure on the flexible display medium layer is incomplete or the flexible display medium layer has no driving electrode structure when the inspection unit performs an inspection. Thus, if a portion of the flexible display medium layer does not reach the demanded performance, the malfunctioning region can be cut off or, according to the degree of malfunction, repaired in a subsequent process of fabricating the driving electrode. Hence, a greater product yield or product grades is produced while less driving electrodes are wasted.

The inspection unit applies an electric field or a magnetic field to the flexible display medium layer to perform an inspection. After the inspection, the recording unit is coupled to the inspection unit and, according to the results of the inspection unit, the performance level of the flexible display medium layer and the malfunctioning region information are labeled. The labeling action may include directly marking the malfunction region on the flexible display medium layer or recording the coordinates of the malfunction region in a data storage device, or displaying the information.

Figure 3:
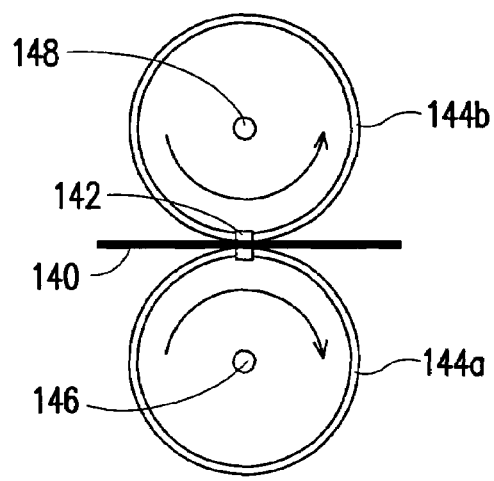
FIG. 3 is a side view of an inspection apparatus for inspecting a flexible display medium layer according to one embodiment of the present invention.

In the following, a more concrete description of the structure of the inspection apparatus according to the present invention is provided. FIG. 3 is a side view of an inspection apparatus for inspecting a flexible display medium layer according to one embodiment of the present invention. As shown in FIG. 3, the inspection unit and the conveyor system are integrated together to form an integrated unit.

The inspection apparatus in FIG. 3 is first described. The fabrication of driving electrodes on the flexible display medium layer 140 has not finished. Without any electrode on the flexible display medium layer 140, electric field or magnetic field necessary for inspecting the flexible display medium layer 140 has to be applied externally. To apply an electric field, for example, a pair of electrode plates has to be disposed on the flexible display medium layer 140 such that an electric field is applied to a corresponding region 142 of the flexible display medium layer 140 to be inspected. With regards to the transportation of the flexible display medium layer 140, a pair of counter-rotational rollers can be used to grip the flexible display medium layer 140 and transport the layer 140 in one direction. In FIG. 3, only part of the mechanical transportation structure is drawn. In the present embodiment, the surface of one of rollers has a roller electrode layer 144a and the surface of the other has a roller electrode layer 144b. By applying an appropriate voltage to the two roller electrode layers 144a and 144b, a suitable electric field can be produced in the corresponding region 142 for performing an inspection.

Furthermore, to inspect the performance of the corresponding region 142 of the flexible display medium layer 140, a light source 146 and a detector 148 are also included. The performance to be inspected includes, for example, the optical properties, the opto-electric properties or other physical properties under the influence of a magnetic field. Here, the performance refers to the some properties that need to be inspected according to the actual requirements. After the light from the light source 146 passes through or is reflected from the corresponding region 142 of the flexible display medium layer 140, the detector 148 receives and process the optical signal. As shown in FIG. 3, light passes through the flexible display medium layer 140 and is subsequently collected by the detector 148 for further processing. By hollowing the upper portion of the roller or making it transparent and selecting a transparent electrode, light can easily pass through. Hence, the detector 148 can receive optical signal. After the required signal processing and analysis, the performance level of the corresponding region 142 of the flexible display medium layer 140 can be ascertained. The signal-processing section of the detector 148 can be provided internally or externally through an external process unit, for example, a computer. This is an understandable design and modification.

Figure 8:
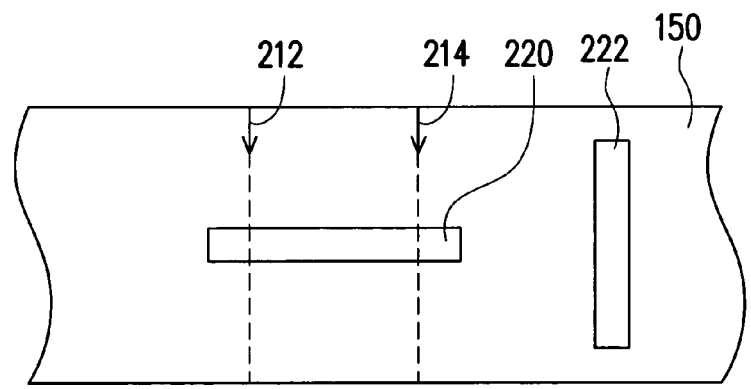
FIGS. 8 and 9 are top views showing the shape of the inspection area of the flexible display medium layer according to the present invention.

According to the inspected performance level, information regarding the malfunction region can be determined. The malfunction region information includes the location of the malfunction region or a performance grade corresponding to the malfunction region, for example. The information is helpful to the subsequent processing treatment detailed later in FIG. 8. Furthermore, the inspection result can be directly labeling a malfunction region on the flexible display medium layer or recording the coordinates of the malfunction region or the performance information in a data storage device, or even also directly displaying the results. The data storage device or a recording or displaying unit can be integrated with the detector 148 internally or linked to an external system such as a computer system (not shown). In practice, the actual processing and recording portion of the inspection apparatus can be arranged by anyone familiar with the techniques to follow the principles indicated in FIG. 3. Moreover, modifications should be made according to the actual design without limiting the scope of the present invention. In other words, the inspection unit and the conveyor system can be integrated together to form a unit while the recording unit can also be integrated with the unit or set up externally.

In addition, anyone familiar with opto-electronic techniques may set up a polarizing unit (not shown) on the top, bottom or either sides of the flexible display medium layer to provide the needed polarizing switching action on the light.

Furthermore, the aforementioned figure of the apparatus only displays all the elements related to the present invention. The actual apparatus may include other circuits and components not shown in the figure. However, anyone familiar with the technique should be able to understand and implement.

Figure 4:
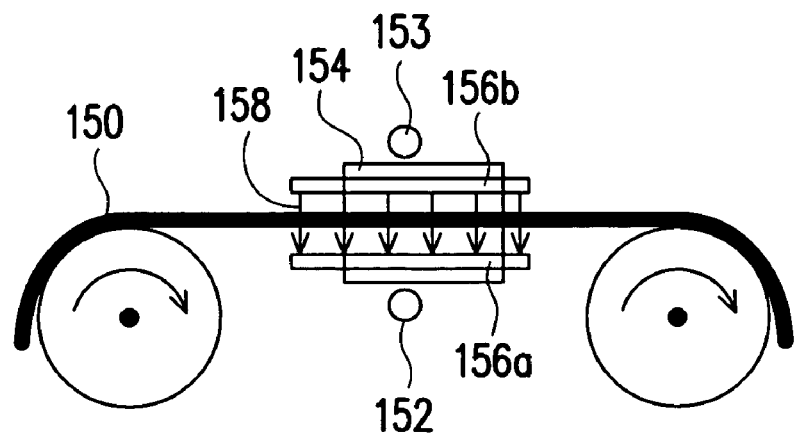
FIG. 4 is a side view of an inspection apparatus for inspecting a flexible display medium layer according to another embodiment of the present invention.

FIG. 4 is a side view of an inspection apparatus for inspecting a flexible display medium layer according to another embodiment of the present invention. As shown in FIG. 4, the conveyor system and the inspection unit of the inspection apparatus for inspecting the flexible display medium layer are designed as separate units. The conveyor system comprises a set of rollers and provides for transporting a flexible display medium layer 150. The inspection unit comprises a pair of electrode plates 156a and 156b capable of generating an electric field 158. As the flexible display layer passed the inspection area 154, it can be under the electric field. Due to some common characteristics between the electric and the magnetic field, the pair of electrode plates can be replaced by a pair of magnetic coils so that an inspection using a magnetic field can be implemented. In FIG. 4, an inspection with an electric field 158 is used and the light passing through the flexible display medium layer is collected for subsequent analysis, for example. The light source 152 and the detector 153 can be set up in a way similar to the one shown in FIG. 3, the detail of which is not repeated here. In this embodiment, the conveyor system is designed to operate independently.

Figure 5A:
FIGS. 5A and 5B are schematic cross-sectional views of a flexible display medium layer according to the present invention.
Figure 5B:
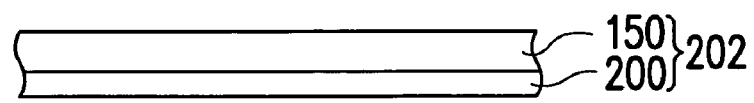
Figure 6A:
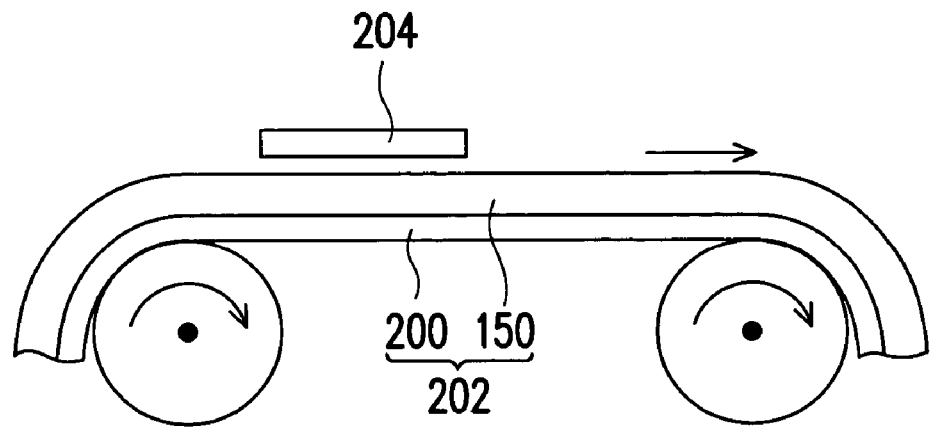
FIGS. 6A and 6B are side views of an inspection apparatus for inspecting a flexible display medium layer according to another embodiment of the present invention.

Thereafter, for the flexible display medium layer 150 shown in FIG. 3 or FIG. 4, also shown in FIG. 5A, there is no driving electrode structure formed on the display device so that only the display dielectric medium layer is present. However, based on the technical aspect described in FIG. 3 or FIG. 4, it can also be applied to a flexible display medium layer 150 with the complete fabrication of a single electrode layer. As shown in FIG. 5B, an electrode layer 200 is formed on one side of the flexible display medium layer 150 to form a flexible display medium layer 202 with only one electrode layer. The inspection system of flexible display medium layer 202 could be similar to FIG. 4 and be arranged as FIG. 6A. In FIG. 6A, because there is an electrode layer 200 formed on the flexible display medium layer 202, the electrode layer 200 can be directly used as an inspection electrode. Under these circumstances, one more electrode plate 204 needs to be set. The transportation of the flexible display medium layer 202 can be provided by a set of rollers, for example.

Figure 6B:
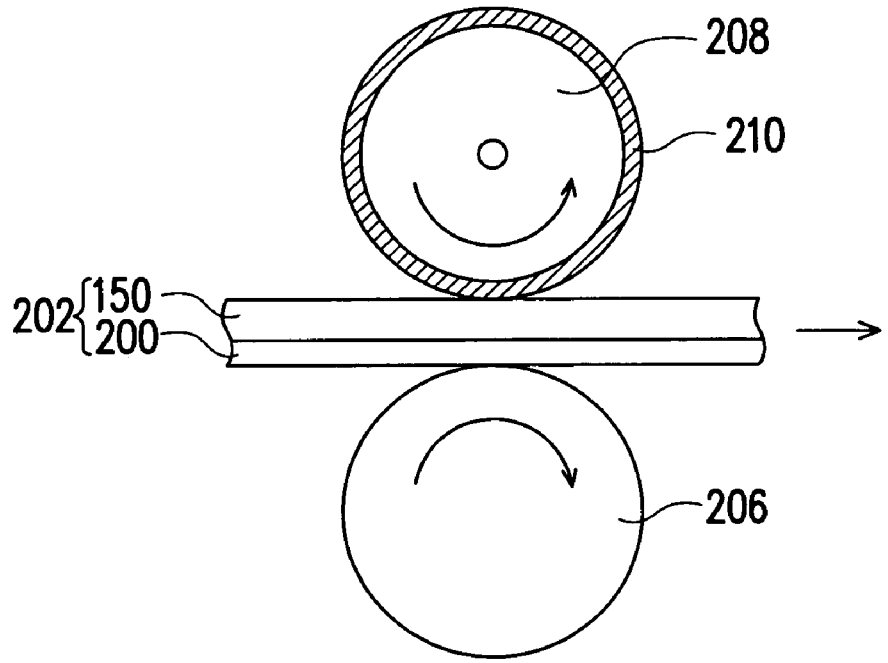

Furthermore, according to the principles of organization shown in FIG. 3, it can be modified into another design shown in FIG. 6B. The two rollers 206 and 208 can be used to transport the flexible display medium layer 202. Because the flexible display medium layer 202 already has an electrode layer 200 formed thereon, only a roller electrode layer 210 is set up on the surface of the roller 208. Therefore, the electric field needed for performing the inspection can be obtained by applying a suitable voltage to the roller electrode layer 210 and the electrode layer 200. Since the detection and recording section of the apparatus are identical, a detailed description is not repeated here.

Figure 10:
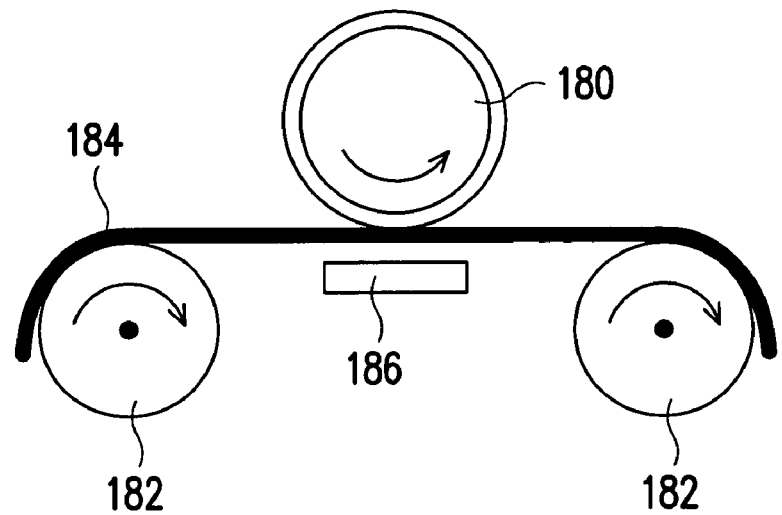
FIGS. 10 through 12 are the side views of inspection apparatus for inspecting the flexible display medium layer according to another embodiment of the present invention.
Figure 11:
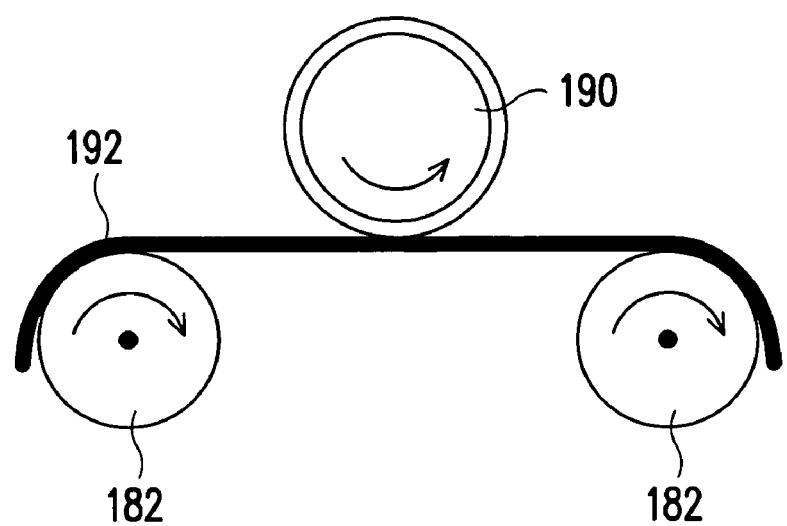

Yet, the present invention is not limited to the foregoing description. For example, various combinations of the aforementioned description can be arranged. Examples of some other design modifications are shown in FIGS. 10 and 11.

Figure 7:
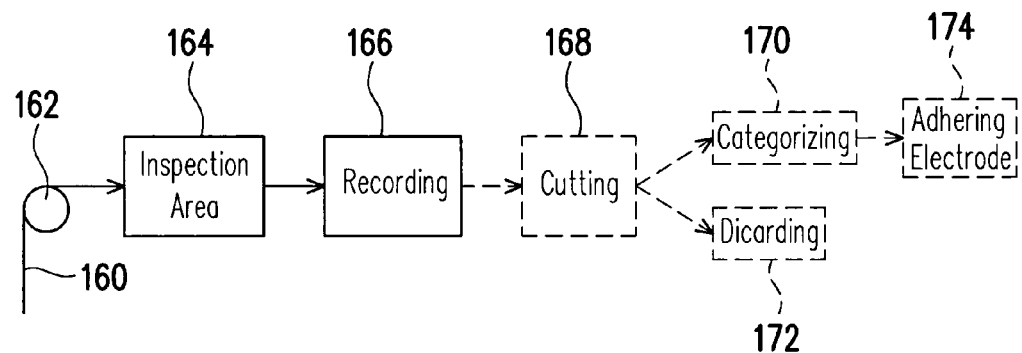
FIG. 7 is a flow diagram showing the steps for inspecting the flexible display medium layer according to the present invention.

In the following, a viewpoint of the method of inspecting a flexible display medium layer is described according to flow diagram in FIG. 7. First, a flexible display medium layer 160 demanded to be inspected is provided. Here, the driving electrode structure needed on the flexible display medium layer is still not fully formed or there is no need for any driving electrode structure on the flexible display medium layer. Through the conveyor system 162, the flexible display medium layer is being transported in a direction passing under an inspection area 164. Then, a performance inspection is carried out to check the performance of the flexible display medium layer on passing a corresponding region of the inspection area 164. The inspection result is recorded 166. According to the performance level found in the inspection, information regarding the malfunction region on the flexible display medium layer is recorded. Thereafter, according to the grade level found in the performance inspection, the flexible display medium layer is cut up 168. After that, according to each cutout section after cutting the flexible display medium layer, grades are assigned 170, or if situation demands, some are discarded 172. Then, suitable electrodes are adhered according to the grades of the sorting sections 174 so that different products or graded products are produced.

Figure 9:
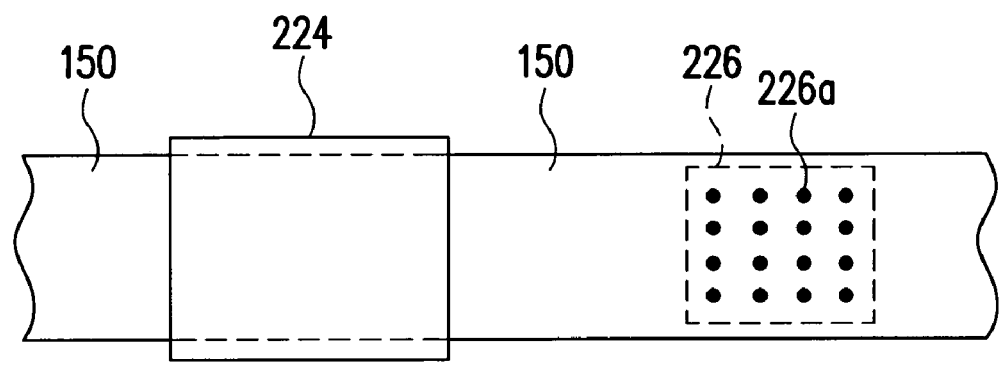

After the inspection, the malfunction regions can be directly labeled 212, 214 on the flexible display medium layer 150 or stored inside a memory device. Furthermore, the effective inspection area could be linear areas 220, 222 in FIG. 8, a surface area 224 in FIG. 9 or a dotted array 226 with a plurality of inspection points 226a. The aforementioned area shapes are just a few embodiments. It can be modified according to the actual design and still be regarded as within the scope of the present invention.

Moreover, based on the design principles shown in FIGS. 3, 4, 6A and 6B, the arrangement of the apparatus can be modified accordingly. As shown in FIG. 10, a roller 182 is used to transport the flexible display medium layer 184. With this arrangement, an electrode plate 186 and a roller 180 having a roller electrode layer thereon can be deployed. The roller 180 and the set of rollers 182 in the conveyor system may join forces to provide the transporting power. However, the roller 180 can rotate freely independently. Therefore, the roller 180 is in contact with the flexible display medium layer 184 and rotates because of that.

In addition, as shown in FIG. 11, another variation of the present invention is shown. An electrode layer has already formed on the flexible display medium layer 192 similar to FIG. 5B. Another electric field is applied through a roller electrode layer on the surface of the roller 190. The power for transporting the flexible display medium layer 192 is provided by the set of rollers 182. The roller 190 is similar to the roller 180 in FIG. 10 and can join forces with the rollers 180 of the conveyor system in driving the flexible display medium layer 192 or rotate freely without providing any driving.

Figure 12:
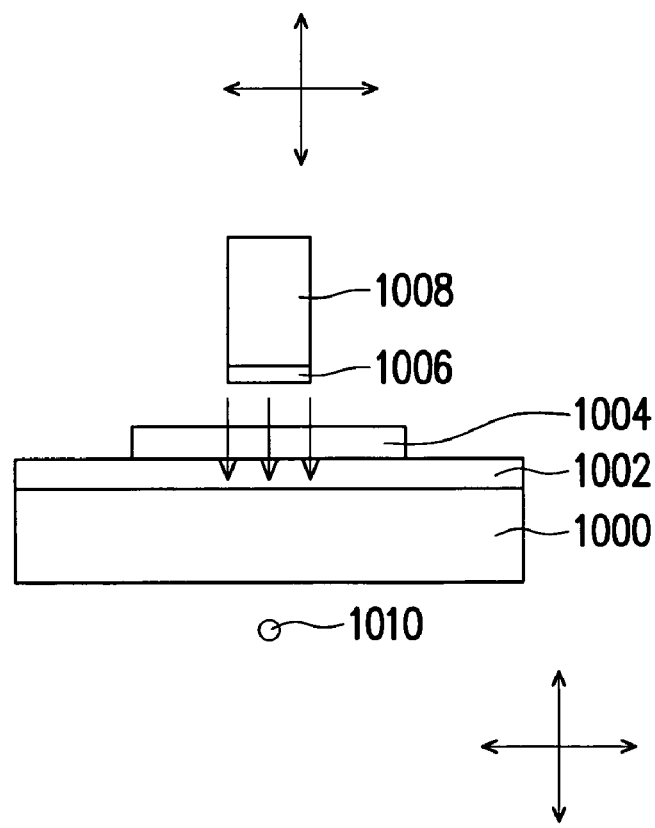

According to the aforementioned inspection mechanism, the present invention is also suitable for processing the flexible display medium layer in pieces. For example, as shown in FIG. 12, each piece of the flexible display medium layer 1004 can be independently inspected on an inspection machine. The inspection machine can have a number of designs according to the aforementioned inspection mechanisms. FIG. 12 shows one embodiment. In FIG. 12, the flexible display medium plate 1004 is placed on a base stage 1000. If the flexible display medium plate 1004 has no electrode layer, the base stage 1000 may include an electrode layer 1002, for example, a grounded electrode layer. To provide a light-penetration inspection, one side of the base stage 1000 may arrange a light source 1010 with the base stage 1000 made from a transparent material that permits the penetration of light. An inspection unit 1008 is set up on another side of the base stage 1000. In order to provide an electric field for the inspection, one end of the inspection unit 1008 has another electrode layer 1006. In the design of FIG. 12, the inspection unit 1008 or the base stage 1000 can provide the plate 1004 at least two-dimensional movement for inspecting the inspection areas on the flexible display medium 1004. Conventional techniques can be used to drive the inspection unit 1008 or the base stage 1000. Since conventional techniques are used, a detailed description in these areas is omitted.

In summary, in the inspection method and inspection apparatus of the present invention, a performance level inspection of the flexible display medium layer is carried out before the fabrication of the electrode layers is complete or prior to the fabrication of the electrode layers. Thus, some production cost is saved and the yield is increased. Furthermore, the inspection apparatus can have a design that integrates the conveyor system and the inspection unit together or a design with separately designed conveyor system and inspection unit.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of inspecting a flexible display medium layer, comprising:

providing a flexible display medium layer that needs to be inspected, wherein a driving electrode structure to be formed on the flexible display medium layer is not complete or there is no driving electrode structure on the flexible display medium layer;

passing the flexible display medium layer over an inspection area;

performing a performance inspection to inspect the performance of a corresponding region of the flexible display medium layer passing through the inspection area by;

applying an electric field or magnetic field on the flexible display medium layer;

performing a performance inspection on the corresponding region; and using at least a polarizing unit to generate necessary switching action of polarized light; and recording, labeling or displaying the inspection result to obtain a performance information of the flexible display medium layer.

2. The inspection method of claim 1, wherein the performance information includes at least either the location of the malfunction region or the performance grading of the corresponding region.

3. The inspection method of claim 1, wherein the step of recording, labeling or displaying the inspection result includes labeling the malfunction region on the flexible display medium layer or recording coordinates of the malfunction region or the performance information on a data storage device, or directly displaying the inspection result.

4. The inspection method of claim 1, wherein the inspection area is a linear area, a dot matrix area or a surface area.

5. The inspection method of claim 1, wherein the step of performing the performance inspection comprises illuminating a light on the flexible display medium.

6. An inspection apparatus for inspecting a flexible display medium layer, comprising:
   an inspection unit, comprising at least a polarizing unit for generating the necessary switching action of polarized light;
   a conveyer system for conveying the flexible display medium layer or the inspection unit, so that the flexible display medium layer passes through the inspection unit and the inspection unit inspects a corresponding region of the flexible display medium layer passing the inspection area, wherein a driving electrode structure to be formed on the flexible display medium layer is not complete or there is no driving electrode structures on the flexible display medium layer; and
   a recording, labeling or displaying unit, coupled to the inspection unit such that a performance information regarding the corresponding region on the flexible display medium layer is obtained.

7. The inspection apparatus of claim 6, wherein the flexible display medium layer has no driving electrode structures.

8. The inspection apparatus of claim 7, wherein the inspection unit includes:
   a pair of electrode plates or a pair of magnetic poles for applying an electric field or a magnetic field to the corresponding region of the flexible display medium layer;
   a light source illuminating the corresponding region and
   a detector for receiving an optical signal from the light passing through the flexible display medium layer or reflected from the flexible display medium layer and obtaining the performance information with respect to the corresponding region after performing some processing and analyzing.

9. The inspection apparatus of claim 6, wherein the inspection area is a linear area, a dot matrix area or a surface area.

10. The inspection apparatus of claim 6, wherein the recording, labeling or displaying unit directly labels a malfunction region on the flexible display medium layer or records coordinates of the malfunction region or the performance information in a data storage device, or directly display an inspection result.

11. The inspection apparatus of claim 6, wherein the driving electrode structure on the flexible display medium layer only has one electrode layer.

12. The inspection apparatus of claim 11, wherein the inspection unit comprises:
   an external electrode unit coupled to the electrode layer on the display media for applying an electrode field or a magnetic field on the corresponding region of the flexible display medium layer;
   a light source for illuminating the corresponding region; and
   a detector for receiving an optical signal from the light passing through the flexible display medium layer or reflected from the flexible display medium layer, and obtaining the performance information after performing processing and analyzing the optical signal.

13. The inspection apparatus of claim 6, wherein the flexible display medium layer is disposed on a base stage that can be moved relative to the inspection unit.

14. The inspection apparatus of claim 6, wherein the inspection unit includes a light source for illuminating the corresponding region of the flexible display medium.

* * * * *